ALKYLENE OXIDE ADDUCTS OF TERMINALLY UNSATURATED POLYOLS

Clare A. Carter, South Charleston, Louis F. Theiling, Jr., Charleston, and Robert J. Knopf, St. Albans, W. Va.
No Drawing. Filed Mar. 6, 1959, Ser. No. 797,573
6 Claims. (Cl. 260—615)

This invention relates in general to the preparation of adducts of unsaturated polyols. More particularly, this invention relates to the alkylene oxide adducts of terminally unsaturated polyols and a process for their preparation.

Polyfunctional molecules are generally of great value in industry due to the presence of more than one reactive group within a given molecule. Such compounds can lead to a variety of useful reactions and products. Among the polyfunctional compounds are the polyols which find wide use in many fields. For example, both propylene glycol and glycerine are utilized as tobacco humectants, ethylene glycol finds extensive use in the manufacture of synthetic fibers, alkyl resins, antifreeze, and the polyethylene glycols have found broad acceptance in the pharmaceutical and cosmetic fields. These and other polyols are also used extensively as freezing point depressants, brake fluids, solvents, plasticizers and the like.

One of the more promising fields for polyols, particularly those containing an active double bond is in the preparation of polyurethane elastomers. By employing an unsaturated diol or triol as part of the basic polyurethane polymer network the resulting polymer may be conveniently vulcanized by the conventional methods used for curing rubber. The presence of the double bond permits the vulcanization, for example, by sulfur, peroxides and the like, thus, for example, a polymeric polyurethane can be prepared by reacting a polymeric glycol with an organic diisocyanate and the unsaturated polyol to obtain a polymer which can be cured with conventional curing agents. In general, with this method, the unsaturated polyol is used to the extent of about 1 to 10 percent by weight in the final polyurethane elastomer formulation and is vulcanized with about 0.5 to 10 parts by weight of sulfur or other curing agent per 100 parts of polymer. Curing at temperatures of about 125° C.–160° C. for from one-half to several hours is generally sufficient. Depending on the particular polyurethane used, various modifications of the curing step may be employed.

Heretofore, low molecular weight non-polymeric glycols having aliphatic side chains containing olefinic unsaturation have been used together with high molecular weight polymeric glycols and organic diisocyanates to form polyurethane elastomers which can be cured by sulfur. Representative of such low molecular weight non-polymeric glycols are compounds such as 2-vinyl-1,3-propanediol, 3-allyloxy-1,5-pentanediol, 3-(2-methylallyloxy)-1,2-propanediol and the like. In using the low molecular weight non-polymeric glycols to prepare the polymeric polyurethanes various procedures can be employed. For instance a molar excess of organic diisocyanate can be reacted with the non-polymeric glycol to provide an isocyanate terminated product, which can then be reacted with the polymeric glycol reactant. Another procedure is to first react the polymeric glycol with a molar excess of the organic diisocyanate to provide an isocyanate-terminated polymer after which the non-polymeric glycol is used to extend the chain and also to react with any free organic diisocyanate which might be present. The urethane group is formed in each instance by the reaction of the terminal hydroxyl groups of the glycol with the terminal isocyanate group of the organic diisocyanate.

In general, polyalkyleneether glycols are preferred as the polymeric glycols. Particularly preferred are polyethers having a highly branched chain network. Highly branched polyethers have the advantage of making possible cross linking without the interaction of urea or urethane groups. This has the advantage of making a larger proportion of the isocyanate available for reaction with other glycols, thus reducing the overall amount of isocyanate required. Preferred polyethers are those prepared from alkylene oxides and polyols.

The instant invention is therefore directed to the preparation of alkylene oxide adducts of terminally unsaturated polyols, hereinafter described, and which are useful as essential components in the preparation of vulcanizable polyurethane elastomers. The word "adduct," as used throughout the specification and appended claims, refers to the novel compounds formed by the interaction of one or more hydroxyl groups of the terminally unsaturated polyols with alkylene oxides or mixtures thereof. The compounds of this invention exhibit numerous advantages, many of which have been found to be lacking in alkylene oxide adducts heretofore available. Moreover, the compounds of this invention, when incorporated as part of the basic polyurethane polymer network, produce vulcanizable polyurethane elastomers which can easily be cured by conventional curing agents.

Accordingly, one or more of the following objects will be achieved by the practice of this invention. It is an object of the present invention to provide a new series of alkylene oxide adducts of terminally unsaturated polyols. It is another object of the present invention to provide novel compounds which are useful in the preparation of vulcanizable polyurethane elastomers. Another object of the present invention is to provide ethylene oxide adducts of terminally unsaturated diols; a further object is to provide propylene oxide adducts of terminally unsaturated triols; a still further object of the present invention is to provide ethylene oxide adducts of terminally unsaturated triols; another object is to provide propylene oxide adducts of terminally unsaturated diols; a further object of the present invention is to provide mixed alkylene oxide adducts of terminally unsaturated polyols; an object of the present invention is to provide a process for the preparation of these novel compounds hereinabove mentioned. These and other objects will become readily apparent to those skilled in the art in the light of the teachings herein set forth.

The alkylene oxide adducts of the terminally unsaturated polyols of this invention can be represented by reference to the following general formula:

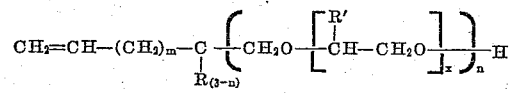

wherein R is an unsubstituted monovalent aliphatic hydrocarbon group; R' is a member selected from the class consisting of hydrogen and alkyl groups; $m$ is a whole positive integer of from 0 to 0; $n$ is a whole positive integer of from 2 to 3; and $x$ is a whole positive integer greater than 0. Preferred compounds are those wherein R is an unsubstituted straight or branched chain alkyl group containing from 1 to 10 carbon atoms, R' is hydrogen or an alkyl group having 1 to 6 carbon atoms, and $x$ is an integer sufficiently large to give a molecular weight of from about 750 to about 10,000, the

group may be of varying structure throughout the same molecule depending upon the alkylene oxide or mixtures thereof utilized in the preparation of these novel compounds.

The alkylene oxide adducts of the present invention can be prepared from terminally unsaturated polyols having the following formula:

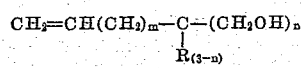

wherein $n$, $m$, and R are the same as indicated above. These compounds can be obtained from readily available starting materials. Illustrative of these terminally unsaturated polyols are 2,2-bis(hydroxymethyl)-4-pentenol, 2-hydroxymethyl-2-methyl-4-pentenol, 2-hydroxymethyl-2-ethyl-4-pentenol, 2-hydroxymethyl-2-propyl-4-pentenol, 2-hydroxymethyl-2-isopropyl-4-pentenol, 2-hydroxymethyl-2-n-butyl-4-pentenol, 2-hydroxymethyl-2-t-butyl-4-pentenol, 2-hydroxymethyl-2-heptyl-4-pentenol, and the like. The preparation of the terminally unsaturated polyols is the subject matter of an application by L. F. Theiling, Jr., and R. J. Knopf, Serial No. 761,284, filed September 5, 1958, now U.S. Patent No. 2,982,790, and assigned to the same assignee as the instant application. Reference is hereby made to that application for the preparation of the starting materials of the instant invention.

By employing polyols of varying structure, the potentiality of producing more desirable characteristics in the polyurethane elastomers is available. The polyols employed as starting materials for the present invention are especially unique since the molecules contain no functional groups other than the desired hydroxyl and terminal olefin groupings. Thus no etheric oxygen or other groups are present which may influence the reactivity of the hydroxyl or olefinic groups. Particularly noteworthy is the fact that the hydroxymethyl groups of the polyols are attached to carbon atoms containing no alpha hydrogen atom, and thus, would be expected to show increased thermal stability over other polyols.

The alkylene oxides employed in the practice of this invention can be represented by the general formula:

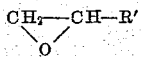

wherein R' is the same as indicated above. Thus, for example, ethylene oxide, propylene oxide, butylene oxide, and the like are all applicable to the process of the present invention. Additionally, a mixture of different alkylene oxides can also be employed in the practice of this invention.

The novel compounds of this invention can be prepared having molecular weight in the range of from about 750 to about 10,000 and more preferably from about 750 to about 5,000. A particularly preferred molecular weight of from about 800 to 1,400 can also be prepared. It is, of course, possible to produce adducts having most any desired molecular weight by controlling the amount of alkylene oxide added to the terminally unsaturated polyol. While no hard and fast molecular weight can be designated for compounds used in preparation of polyurethane elastomers, the art is well appraised of the technique of formulating polyurethane elastomers in which polyethers are an essential component. The molecular weight will largely be determined by the properties desired in the elastomer product.

In one embodiment of the instant invention from 3.36 to 5.91 moles of the terminally unsaturated polyol and 0.21 to 0.35 moles of powdered potassium hydroxide were charged to a stainless steel autoclave equipped with a circulating pump, steam jacket, and automatic controls to regulate water and alkylene oxide feed. The autoclave was sealed, purged with nitrogen and the contents heated to 110° C. From 60.3 to 98.8 moles of an alkylene oxide was then fed to the autoclave at a rate sufficient to maintain a constant temperature of 110° C. and an internal pressure of from 0 to 40 pounds per square inch gauge. At the completion of the oxide feed, the autoclave temperature was adjusted to 100° C. and maintained at that temperature until the internal pressure decreased to a minimum value which remained constant for a period of at least two hours. The crude product was then neutralized and refined by agitating with a suitable calcium magnesium or aluminum silicate for about 10 hours at 90° C. under an atmosphere of nitrogen. The adduct was then recovered by filtration.

The following examples are illustrative of the best mode presently contemplated for the practice of this invention. Unless otherwise indicated all parts are by weight.

EXAMPLE I

Propylene Oxide Adduct of 2-Hydroxymethyl-2-Methyl-4-Pentenol 768 parts by weight (5.91 moles) of 2-hydroxymethyl-2-methyl-4-pentenol and 19.5 parts of powdered potassium hydroxide were charged to a two-gallon stainless steel autoclave equipped with a circulating pump, automatic controller to regulate jacket steam and water, and a second automatic controller to regulate propylene oxide feed. The autoclave was then sealed, purged with nitrogen and the contents heated to 110° C. 5,732 parts by weight (98.8 moles) of propylene oxide was then fed to the autoclave at a rate sufficient to maintain a constant temperature of 110° C. at an internal pressure of 40 pounds per square inch gauge. When the addition of the propylene oxide was completed, the autoclave temperature was adjusted to 100° C. and maintained at that temperature until the internal pressure decreased to a minimum value which remained constant for a period of two hours. The crude product was neutralized and refined by agitating with one weight percent magnesol[1] or some other suitable calcium, magnesium, or aluminum silicate. This treatment was continued for 10 hours at 90° C. under an atmosphere of nitrogen. The product was then recovered by filtration. The filtered material was very viscous, had a color of 350 platinum-cobalt and an average molecular weight of between 992 and 1359. The average molecular weight based on hydroxyl determination was 992 while the average molecular weight based on unsaturation was 1359.

EXAMPLE II

Propylene Oxide Adducts of 2,2-Bis(Hydroxymethyl)-4-Pentenol 490 parts by weight (3.36 moles) of 2,2-bis(hydroxymethyl)-4-pentenol and 12 parts of potassium hydroxide were charged to the autoclave described in Example I. Since 2,2-bis(hydroxymethyl)-4-pentenol has a relatively high melting point (90° to 91° C.), the material was dissolved in 774 parts by weight of diethyl Carbitol[2] before charging to the autoclave. Thereupon, the autoclave was sealed, purged with nitrogen, and the contents heated to 110° C. 3,500 parts (60.3 moles) of propylene oxide was then fed to the autoclave at a rate sufficient to maintain a constant temperature of 110° C. at an internal pressure of 40 p.s.i.g. At the completion of the oxide feed the autoclave temperature was adjusted to 100° C. and maintained at that temperature until the internal pressure decreased to a minimum value which remained constant for a period of two hours. The diethyl Carbitol was removed by stripping at 90° C., under full vacuum, and the crude product thereafter neutralized and refined by agitating with one weight percent of Magnesol or some other suitable calcium, magnesium or aluminum silicate. This treatment was continued for 10 hours at 90° C. under an atmosphere of nitrogen. The product recovered by filtration was a viscous liquid having a color

[1] A Food Machinery and Chemical Corporation's trademark for a highly absorptive synthetic anhydrous magnesium silicate.
[2] A Union Carbide Corporation's trademark for a colorless liquid ether having the formula: $O(C_2H_4OC_2H_5)_2$.

of 8 as measured on the Gardner scale and an average molecular weight between 1,080 and 1,188. The average molecular weight based on hydroxyl determination was 1,080 while that based on unsaturation was 1,188.

EXAMPLE III

*Ethylene Oxide Adducts of 2-Hydroxymethyl-2-Methyl-4-Pentenol*

173 parts by weight (1.33 moles) of 2-hydroxymethyl-2-methyl-4-pentenol and 8.0 parts of potassium hydroxide were charged to a three-neck jacketed flask which was equipped with an agitator, reflux condenser suitable for use with Dry Ice-acetone mixture, a gas induction tube for providing a blanket of nitrogen above the reaction mixture, and a jacketed brine cooled addition funnel through which the alkylene oxide could be introduced. The flask was purged with nitrogen and the contents heated to 90 to 100° C. 613 parts (13.4 moles) of ethylene oxide and 810 parts (13.9 moles) of propylene oxide were then fed through the addition funnel into the jacketed flask at a rate sufficient to maintain a constant temperature. The reaction was carried out at atmospheric pressure and 90 to 100° C. The crude reaction product was neutralized and refined by agitating with one weight percent of Magnesol or some other suitable calcium, magnesium or aluminum silicate. This treatment was continued for 10 hours at 90° C. under an atmosphere of nitrogen. The product recovered was a viscous liquid having a color of 3 as measured on the Gardner scale and a viscosity of 12.98 centistokes at 210° F. and 85.6 centistokes at 100° F. as determined on the Cannon-Fenske-Ostwald viscosimeter.

EXAMPLE IV

*Mixed Ethylene Oxide-Propylene Oxide Adduct of 2-Hydroxymethyl-2-Methyl-4-Pentenol*

173 parts by weight (1.33 moles) of 2-hydroxymethyl-2-methyl-4-pentenol and 8.0 parts of potassium hydroxide were charged to a three-neck jacketed flask which was equipped with an agitator, reflux condenser suitable for use with Dry Ice-acetone mixture, a gas induction tube for providing a blanket of nitrogen above the reaction mixture, and a jacketed brine cooled addition funnel through which the alkylene oxide could be introduced. The flask was purged with nitrogen and the contents heated to 90 to 100° C. 613 parts (13.4 moles) of ethylene oxide and 810 parts (13.9 moles) of propylene oxide were then fed through the addition funnel into the jacketed flask at a rate sufficient to maintain a constant temperature. The reaction was carried out at atmospheric pressure and 90 to 100° C. The crude reaction product was neutralized and refined by agitating with one weight percent of Magnesol or some other suitable calcium, magnesium or aluminum silicate. This treatment was continued for 10 hours at 90° C. under an atmosphere of nitrogen. The product recovered was a viscous liquid having a color of 2 as measured on the Gardner scale and a viscosity of 11.5 centistokes at 210° F. and 74.6 centistokes at 100° F. as determined on the Connor-Fenske-Ostwald viscosimeter. The average molecular weight based on hydroxyl determination was 865 while that based on unsaturation was 1,260.

The foregoing detailed description has been given for clearness of understanding of the present invention, and no unnecessary limitations are to be understood therefrom except as such limitations appear in the claims.

What is claimed is:

1. An alkylene oxide adduct of a terminally unsaturated polyol of the formula:

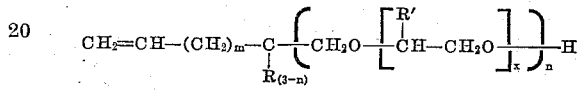

wherein R is an unsubstituted monovalent aliphatic hydrocarbon group containing from 1 to 10 carbon atoms; R' is a member selected from the class consisting of hydrogen and alkyl groups containing from 1 to 6 carbon atoms; $m$ is a whole positive integer of from 0 to 10; $n$ is a whole positive integer of from 2 to 3; and $x$ is a whole positive integer of such value that said adduct has a molecular weight within the range of from about 750 to about 1400.

2. An alkylene oxide adduct having the formula of claim 1 wherein the terminally unsaturated polyol is 2-hydroxymethyl-2-methyl-4-pentenol.

3. An alkylene oxide adduct having the formula of claim 1 wherein the terminally unsaturated polyol is 2,2-bis(hydroxymethyl)-4-pentenol.

4. An alkylene oxide adduct having the formula of claim 1 wherein the alkylene oxide is propylene oxide.

5. An alkylene oxide adduct having the formula of claim 1 wherein the alkylene oxide is ethylene oxide.

6. An alkylene oxide adduct having the formula of claim 1 wherein the alkylene oxide is a mixture of ethylene oxide and propylene oxide.

References Cited in the file of this patent

UNITED STATES PATENTS

| | | |
|---|---|---|
| 2,380,185 | Marple et al. | July 10, 1945 |
| 2,574,544 | De Groote | Nov. 13, 1951 |
| 2,729,623 | Gregg | Jan. 3, 1956 |
| 2,792,382 | Edmonds | May 14, 1957 |

UNITED STATES PATENT OFFICE
CERTIFICATE OF CORRECTION

Patent No. 3,042,725                      July 3, 1962

Clare A. Carter et al.

It is hereby certified that error appears in the above numbered patent requiring correction and that the said Letters Patent should read as corrected below.

Column 5, lines 18 and 19, strike out "and 810 parts (13.9 moles) of propylene oxide".

Signed and sealed this 20th day of August 1963.

(SEAL)
Attest:

ERNEST W. SWIDER
Attesting Officer

DAVID L. LADD
Commissioner of Patents